March 2, 1937.    E. J. CLEMONS    2,072,294
CONSTANT PRESSURE GAS REGULATOR
Filed Feb. 25, 1935

Witness
P. L. Bradford.

E. Jay Clemons
INVENTOR

Patented Mar. 2, 1937

2,072,294

UNITED STATES PATENT OFFICE 2,072,294

CONSTANT PRESSURE GAS REGULATOR

Ezra Jay Clemons, Los Angeles, Calif.

Application February 25, 1935, Serial No. 7,944

1 Claim. (Cl. 137—53)

My invention relates to a constant pressure gas regulator and has for its principal object, to provide a relatively simple, practical, efficient and inexpensive device that will, in service maintain a constant pressure of the gas discharged from the device and which result is accomplished by the force exerted by the definite weight of a volume of fluid, preferably a liquid, that is displaced by the pressure of the gas delivered into the device.

Thus a definite degree of pressure per square inch of the gas that passes from the device, is constantly maintained.

A further object of the invention is to provide a pressure regulator of the character referred to, that will produce an outflow of gas under a constant pressure, even though the intake of the gas be intermittent, or in the event of an excess of gas flow to the device.

At the same time my invention enables noxious or poisonous gases to be withdrawn from a vent in the device through a hose or other conduit to a point a safe distance away from the device.

I am aware that there are many devices, such as telescoping tanks and fluid displacing gas holders for the storage of gas, as well as many safety devices for releasing excess pressure and it is one of the objects of my invention to generally improve upon these existing devices and provide a simple and practical device of the character referred to that will be very effective in performing the functions for which it is intended.

Obviously, the device and its chambers may vary in size and shape so as to maintain relatively large or small volumes of gas under a predetermined constant pressure which is determined by the height of the displaced liquid sealing agent which, when at rest, completely fills the lower chamber whose side walls are a continuation of the side walls of the upper chamber.

With the foregoing and other objects in view my invention consists in certain novel features of construction and arrangement of parts that will be hereinafter more fully described and claimed and illustrated in the accompanying drawing in which:

Figure 1:
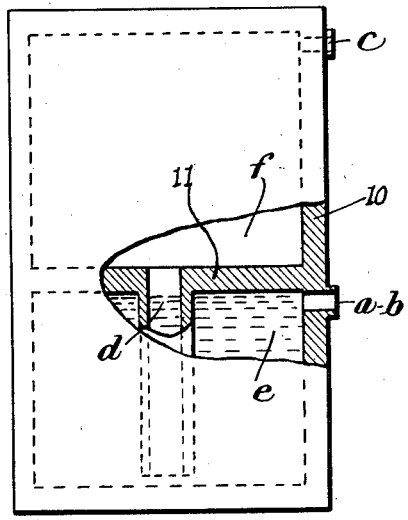
Fig. 1 is a side elevational view of a constant pressure gas regulator constructed in accordance with my invention and with parts thereof broken away and in section.
Figure 2:
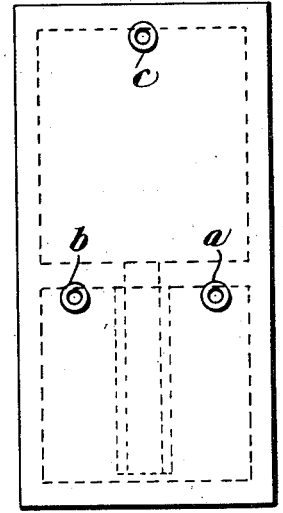
Fig. 2 is a front end view of the regulator.
Figure 3:
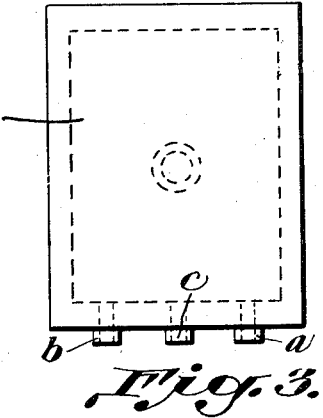
Fig. 3 is a top plan view.

Referring by numerals to the accompanying drawing which illustrates a preferred embodiment of my invention, 10 designates a housing which may be formed of any suitable material and of any desired size and shape and positioned within said housing is a horizontally disposed partition 11.

This partition is arranged so that the chamber $e$ in the housing below the partition is smaller in capacity than the chamber above the partition.

Formed through one of the walls of the housing 10 and communicating with the upper portion of chamber $e$ is a gas inlet opening $a$ and a gas outlet opening $b$.

The appliance or device (not shown) that utilizes the gas under pressure from the chamber $e$ is suitably connected to outlet $b$, and thus provides the resistance or counter pressure necessary to the development of the constant pressure within the chamber $e$.

Formed through one of the walls of housing 10 at the top of chamber $f$ is an excess gas vent $c$. A conduit $d$ depends from partition 11, the upper end of said conduit having communication with the lower portion of chamber $f$, and the open lower end of this conduit terminates adjacent the bottom of chamber $e$.

In the operation of the regulator chamber $e$ is completely filled with fluid, preferably liquid thereby producing pressure that acts against the counter pressure developed at the outlet $b$ due to the appliance or device or applicator connected thereto, and the gas under pressure admitted to chamber $e$ through inlet $a$, displaces a certain amount of fluid from chamber $e$ and forcing same upwardly through duct $d$ into chamber $f$.

Thus the weight due to the height of the displaced fluid exerts constant pressure against the counter pressure exerted at outlet $b$.

Any excess gas that may pass upwardly through duct $d$ discharges through vent $c$ and in the event that such gas is noxious or poisonous, it may be conducted through a hose or other conduit to a point a substantial distance remote from the device.

It is to be understood that the size, shape and construction of the regulator must conform to the exact amount of gas and the exact pressure of gas to be used and that counterpressure must always be maintained against the outer flow of gas and further, that the minimum pressure of gas admitted must be at least sufficient to maintain the level of the sealing liquid in the lower chamber at the lower end of the tube $d$; otherwise the apparatus will not function properly and produce the desired degree of constant pressure.

Thus it will be seen that I have provided a constant pressure gas regulator that is relatively simple in construction, inexpensive of manufacture and very effective in performing the functions for which it is intended.

It will be understood that minor changes in the size, form and construction of my improved constant pressure gas regulator, may be made and substituted for those herein shown and described, without departing from the spirit of my invention, the scope of which is set forth in the appended claim.

I claim as my invention:

A constant pressure gas regulator having two closed chambers, one above the other, the side walls of one chamber being continuations of the side walls of the other, the size of the upper chamber being greater than that of the lower chamber and provided in its upper portion with a normally open vent, a liquid sealing agent which, when at rest, completely fills the lower chamber, a duct leading from the bottom of the upper chamber to the lower portion of the lower chamber and said lower chamber having formed in the side wall of its upper portion an inlet opening and an outlet opening.

EZRA J. CLEMONS.